(12) United States Patent
Takishita et al.

(10) Patent No.: US 9,431,811 B2
(45) Date of Patent: Aug. 30, 2016

(54) INSULATIVE COVER FOR COVERING CASE OF BUSBAR MODULE

(71) Applicant: Yazaki Corporation, Tokyo (JP)

(72) Inventors: Ryuta Takishita, Kakegawa (JP); Yukihisa Kikuchi, Kakegawa (JP); Masaru Imai, Kakegawa (JP); Keizo Aoki, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 17 days.

(21) Appl. No.: 14/323,354

(22) Filed: Jul. 3, 2014

(65) Prior Publication Data

US 2014/0311768 A1  Oct. 23, 2014

Related U.S. Application Data

(63) Continuation of application No. PCT/JP2013/056210, filed on Feb. 28, 2013.

(30) Foreign Application Priority Data

Feb. 28, 2012  (JP) ................................ 2012-042471

(51) Int. Cl.
*H02G 5/04* (2006.01)
*H01M 2/10* (2006.01)
(Continued)

(52) U.S. Cl.
CPC ............. *H02G 5/04* (2013.01); *H01M 2/1072* (2013.01); *H01M 2/206* (2013.01); *H01M 2/34* (2013.01); *H01R 13/447* (2013.01); *H01R 13/506* (2013.01)

(58) Field of Classification Search
CPC ............ H02G 5/04; H02G 5/00; H02G 5/06; H02G 5/066; H02G 3/00; H01B 17/00; H01B 17/56; H01B 17/32; H01B 17/22; H01B 17/06; H01B 17/16; H01B 3/00; H01R 13/5213; H01R 13/44; H01R 13/501; H01R 13/447; H01R 13/453; H01R 13/502; H01M 2/34; H01M 2/1072
USPC ....... 174/66, 68.2, 135, 50.51, 138 F, 110 R, 174/72 B, 88 B, 70 B, 99 B, 129 B, 13, 7 R, 174/176–178, 181, 183, 186, 188, 190, 174/71 B, 137 R, 70 R, 138 R, 139, 147, 174/149 B, 154, 155, 156, 158 R, 168, 172, 174/174, 209, 133 B; 439/521, 519, 718; 429/151, 121

See application file for complete search history.

(56) References Cited

U.S. PATENT DOCUMENTS 5,576,516 A * 11/1996 Kameyama et al. ..... 174/138 F
5,643,693 A *  7/1997 Hill et al. ..................... 429/121
(Continued)

FOREIGN PATENT DOCUMENTS

JP  7-130353 A  5/1995
JP  9-106802 A  4/1997
(Continued)

OTHER PUBLICATIONS

International Search Report (PCT/ISA/210), dated Jun. 6, 2013, issued by the International Searching Authority in counterpart International Patent Application No. PCT/JP2013/056210.
(Continued)

*Primary Examiner* — Dimary Lopez Cruz
(74) *Attorney, Agent, or Firm* — Sughrue Mion, PLLC

(57) ABSTRACT

An insulative cover for covering a case of a busbar module is provided. The insulative cover includes a central cover and side covers. The central cover covers a voltage detection wire accommodating part of the case. The side covers cover busbar accommodating parts of the case. And the side covers are provided at opposite sides of the central cover with hinges between the central cover and the side covers, respectively. In a state where the side covers are folded onto the central cover through the hinges respectively, one and the other of the side covers are locked to each other with a first locking mechanism, respectively.

4 Claims, 10 Drawing Sheets

(51) Int. Cl.
*H01M 2/20* (2006.01)
*H01M 2/34* (2006.01)
*H01R 13/447* (2006.01)
*H01R 13/506* (2006.01)

(56) References Cited

U.S. PATENT DOCUMENTS

| | | | | |
|---|---|---|---|---|
| 5,804,770 | A * | 9/1998 | Tanaka | 174/138 F |
| 6,576,838 | B2 * | 6/2003 | Matsumura | 174/66 |
| 6,828,058 | B2 * | 12/2004 | Ohtsuka et al. | 429/65 |
| 2011/0064987 | A1 | 3/2011 | Ogasawara et al. | |
| 2012/0009447 | A1 | 1/2012 | Ikeda et al. | |
| 2012/0094155 | A1 * | 4/2012 | Lim | 429/82 |
| 2013/0071721 | A1 | 3/2013 | Ogasawara et al. | |
| 2014/0057152 | A1 | 2/2014 | Furuya et al. | |

FOREIGN PATENT DOCUMENTS

| | | |
|---|---|---|
| JP | 200498295 A | 4/2004 |
| JP | 2006269104 A | 10/2006 |
| JP | 2011-60675 A | 3/2011 |
| JP | 201165749 A | 3/2011 |
| JP | 2012164598 A | 8/2012 |
| JP | 20134501 | 1/2013 |
| WO | 2011142201 A1 | 11/2011 |

OTHER PUBLICATIONS

Written Opinion (PCT/ISA/237), dated Jun. 6, 2013, issued by the International Searching Authority in counterpart International Patent Application No. PCT/JP2013/056210.

Office Action dated Dec. 3, 2015, issued by the Japanese Intellectual Property Office in counterpart Japanese Application No. 2012-042471.

* cited by examiner

INSULATIVE COVER FOR COVERING CASE OF BUSBAR MODULE

CROSS REFERENCE TO RELATED APPLICATIONS

This application is a continuation of PCT application No. PCT/JP2013/056210, which was filed on Feb. 28, 2013 based on Japanese Patent Application (No. 2012/042471) filed on Feb. 28, 2012, the contents of which are incorporated herein by reference.

BACKGROUND OF THE INVENTION

1. Field of the Invention

The present invention is related to a cover which covers a case of a busbar module installed to batteries of electric vehicles including hybrid cars. Particularly, the present invention relates to the integration of an insulative cover which covers the electrified parts of busbars which tie battery cells in series with a wire protecting cover which protects the wires of voltage detecting terminals for voltage detection of the battery cells.

2. Description of the Related Art

The PTL 1 discloses a cover structure which includes insulative covers which cover the electrified parts of busbars which connect battery cells in series, and a wire protecting cover which protects wires of voltage detecting terminals for voltage detection of the battery cells.

FIG. 9 is a whole perspective view which shows one embodiment of the cover structure of the power supply device according to the PTL 1. FIGS. 10A and 10B are top views of a case which shows main parts of the cover structure of FIG. 9. FIG. 10A shows that the cover is taken off from the case, and FIG. 10B shows that the cover is closed onto the case.

In FIGS. 9 to 10B, a power supply device 1 includes a plurality of board-like batteries 3 which are arranged in a row to form a battery 2, and a busbar module 4 which is installed onto the battery 2.

Each of the batteries 3 includes a positive electrode and a negative electrode at an upper end. When the front side of a battery 3 is arranged with a positive electrode and the back side of the battery 3 is arranged with a negative electrode, the front side of an adjacent battery 3 is arranged with a negative electrode and the back side of the adjacent battery 3 is arranged with a positive electrode so that the positive electrode of the front side of the battery 3 are connected in series with the negative electrode of the front side of the adjacent battery 3 with a rectangular board-like busbar 5 of FIG. 10A. The electrode at a right-side end penetrates through holes 5a and 13a of the busbar 5 and a terminal 13, projects upwards into a busbar accommodating part 16, and is connected mutually with a clamping nut. The adjacent electrode penetrates through a hole 5a at a left half part of the busbar 5, and is connected with a clamping nut similarly.

The busbar module 4 includes a case 7 made of insulative resin in which the busbars 5 made of conductive metal and thermistors 6 for detecting temperature are installed, and covers 8 made of insulative resin which are installed onto the case 7.

As shown in FIG. 10A, the case 7 includes a plurality of rectangular frames-like busbar accommodating parts 16, a voltage detection wire accommodating part cover 14 which is coupled to the front sides of the busbar accommodating parts 16 with thin flexible walls 17, thermistor accommodating parts 18 integrally following the back sides of the busbar accommodating parts 16, and an oblong belt-like thermistor wire accommodating part 19 integrally following to the back sides of the thermistor accommodating parts 18.

Each of the covers 8 is roughly L-shaped or roughly U-shaped, and arranged at the front side of the electrodes and the busbar 5 at the front side in FIG. 9.

Each of the covers 8 can be freely and independently opened and closed. One thermistor 6 and wires 10 derived from the thermistor 6 are arranged in the case 7 for each of the covers 8. In this example, the thermistors 6 are arranged with a ratio of one thermistor 6 for four batteries 3, and each of the cover 8 covers to protect four electrodes and two busbars 5 corresponding to the four electrodes as well as the thermistor 6 and the wires 10 derived from the thermistor 6 at the same time.

Each of the covers 8 is locked to a locking part 12 of the case 7 with a right locking part 11 and a left locking part 11. A reference number 13 in FIG. 9 is a punched hole for the locking part 11.

In front of the cover 8, the voltage detection wire accommodating part cover 14, which accommodates wires that follow the terminals 13 for voltage detection which are connected to the busbars 5 (FIG. 10A), are formed into an oblong trough-like shape, and the wires for voltage detection are derived from the right and left ends of the case 7 collectively to the outside together with the derived wire 10 for temperature detection.

Each of the busbar accommodating parts 16 includes a frames-like vertical peripheral wall (including front, back, right and left walls) 16, and a horizontal bottom wall 16a having a hole through which electrodes pass. The left end of the peripheral wall of one busbar accommodating part 16 is coupled to the right end of the peripheral wall of an adjacent busbar accommodating part 16 with a flexible hinge 20. The busbar 5 is locked with nails 16b in the peripheral wall, and the voltage detection terminal 13 touches on the top surface at the right half of the busbar 5 and is locked with nails 16b similarly.

The thermistor accommodating parts 18 are disposed in predetermined spaces between the busbar accommodating parts 16 and the thermistor wire accommodating part 19 at the back side. The thermistor accommodating part 18 has a narrow width in the front-to-back direction which is around 2 times the thickness of the thermistor 6, and a length in the left-to-right direction which is slightly longer than the full length of the thermistor 6 in the left-to-right direction. The thermistor accommodating part 18 couples the bottom side of the busbar accommodating part 16 with the bottom side of the thermistor wire accommodating part 19. The thermistor accommodating part 18 is disposed to be lower than the busbar accommodating parts 16 and the thermistor wire accommodating part 19. The wires 10 derived from the thermistor 6 go through vertical right and left ribs 28, and are guided between horizontal right and left ribs 31 of the thermistor wire accommodating part 19, bent from the terminal ends of the right and left ribs 31 to the left side in FIG. 10A and guided along a bent part 32. Then the wires 10 derived from the thermistor 6 are held between a pair of claw parts 33, wired along a horizontal wall (base wall) 30 to the end of the case 7, and derived from the ends of the case 7 to the outside together with other wires for voltage detection as shown in FIG. 9. In this state, as shown in FIG. 10B, the covers 8 are installed onto the case 7, and the busbar 5, the terminals 13 for voltage detection, the thermistors 6 and the derived wires 10 of the thermistors 6 of FIG. 10A are covered to be safely insulatively protected from external interferences.

CITATION LIST

Patent Literatures

[PTL 1] JP-A-2011-60675

SUMMARY OF THE INVENTION

Typically, in the busbar module, the electrified parts of the busbars where battery cells are connected in series and the wires of the voltage detecting terminals for voltage detection of the battery cells must be protected. In the traditional device, as shown in the PTL 1, these protections are performed with separate covers. This is because wires are wired in a factory different from that where the batteries are fixed. When the wires are wired in Factory A and the busbars are fixed to the batteries with the holes 5a (described as fixing parts 5a hereinafter) in Factory B, it is necessary to protect the wires so that the wires will not fly out and get scratched at the time of transporting from Factory A to Factory B.

Therefore, the wires are protected with the voltage detection wire accommodating part cover 14 of FIG. 10A, and the electrified parts are protected with the covers 8 of FIG. 10B.

The voltage detection wire accommodating part cover 14 of FIG. 10A is formed integrally with the case 7, and is constructed to be opened and closed with hinges.

On the other hand, the covers 8 of FIG. 10B are components separate from the case 7. After having fixed the busbars 5 to the batteries with the fixing parts 5a of FIG. 10A in Factory B, the covers 8 are attached to the case 7.

To separately ship the case 7 and the covers 8 from Factory A to Factory B, it is necessary to manage two types of articles.

It is therefore one advantageous aspect of the present invention to provide an insulative cover by integrating the voltage detection wire accommodating part cover with the cover that covers the electrified parts so that it is possible to only manage one article and the administrative expense can be reduced.

According to one advantage of the invention, there is provided an insulative cover for covering a case of a busbar module, the insulative cover comprising:

a central cover configured to cover a voltage detection wire accommodating part of the case; and side covers, configured to cover busbar accommodating parts of the case, and provided at opposite sides of the central cover with hinges between the central cover and the side covers, respectively, wherein in a state where the side covers are folded onto the central cover through the hinges respectively, one and the other of the side covers are locked to each other with a first locking mechanism, respectively.

The insulative cover may be configured such that: the first locking mechanism includes a U-shaped elastic member in one of the side covers and an opening in the other of the side covers; the U-shaped elastic member is configured to get into the opening; in the state where the side covers are folded onto the central cover, the U-shaped elastic members engage in the opening so as to maintain a locked state of the two side covers; and a distal end part of the U-shaped elastic member is configured to be moved with fingers so as to easily release the locked state.

In a state where the side covers are expanded onto the busbar accommodating parts of the case through the hinges, respectively, each of the side covers and the case may be locked to each other with a second locking mechanism.

In a state where the central cover is installed onto the case, the cover and the case may be locked to each other by a third locking mechanism.

With the above construction, because the wire protecting cover of busbar plates and the insulative cover that covers the electrified parts are integrated through the hinges, it is possible to manage one article and the administrative expense can be reduced.

According to the invention, because when the two side covers are folded onto the central cover through the hinges, respectively, one and the other of the two side covers are locked to each other with the first locking mechanism, respectively, even if the two side covers are shocked during transportation, the two side covers will not be expanded.

According to the invention, because the locked state can be released easily by moving the distal end parts of the U-shaped elastic members with fingers, the operativity in factories is improved.

According to the invention, because when the two side covers are expanded through the hinges onto the busbar accommodating parts, respectively, each of the two side covers and the case are locked to each other with the second locking mechanism, the two side covers can be maintained in an expanded state even if the two side covers are shocked at the time of use.

According to the invention, because when the cover is installed onto the case, the cover and the case are locked to each other with the third locking mechanism, the two side covers can be smoothly folded and expanded after that.

BRIEF DESCRIPTION OF THE DRAWINGS

FIG. 4A shows a state that the two side covers are expanded, and FIG. 4B shows a state that the two side covers are folded.

FIG. 6A shows a state just before the locking mechanism A is locked, and FIG. 6B shows a state after the locking mechanism A is locked.

FIG. 7A shows a state just before the locking mechanism B is locked, and FIG. 7B shows a state after the locking mechanism B is locked.

FIG. 8A shows a state just before the locking mechanism C is locked, and FIG. 8B shows a state after the locking mechanism C is locked.

FIG. 10A shows that the cover is taken off from the case, and FIG. 10B shows that the cover is covered onto the case.

DETAILED DESCRIPTION OF THE EXEMPLARY EMBODIMENTS

Figure 1:
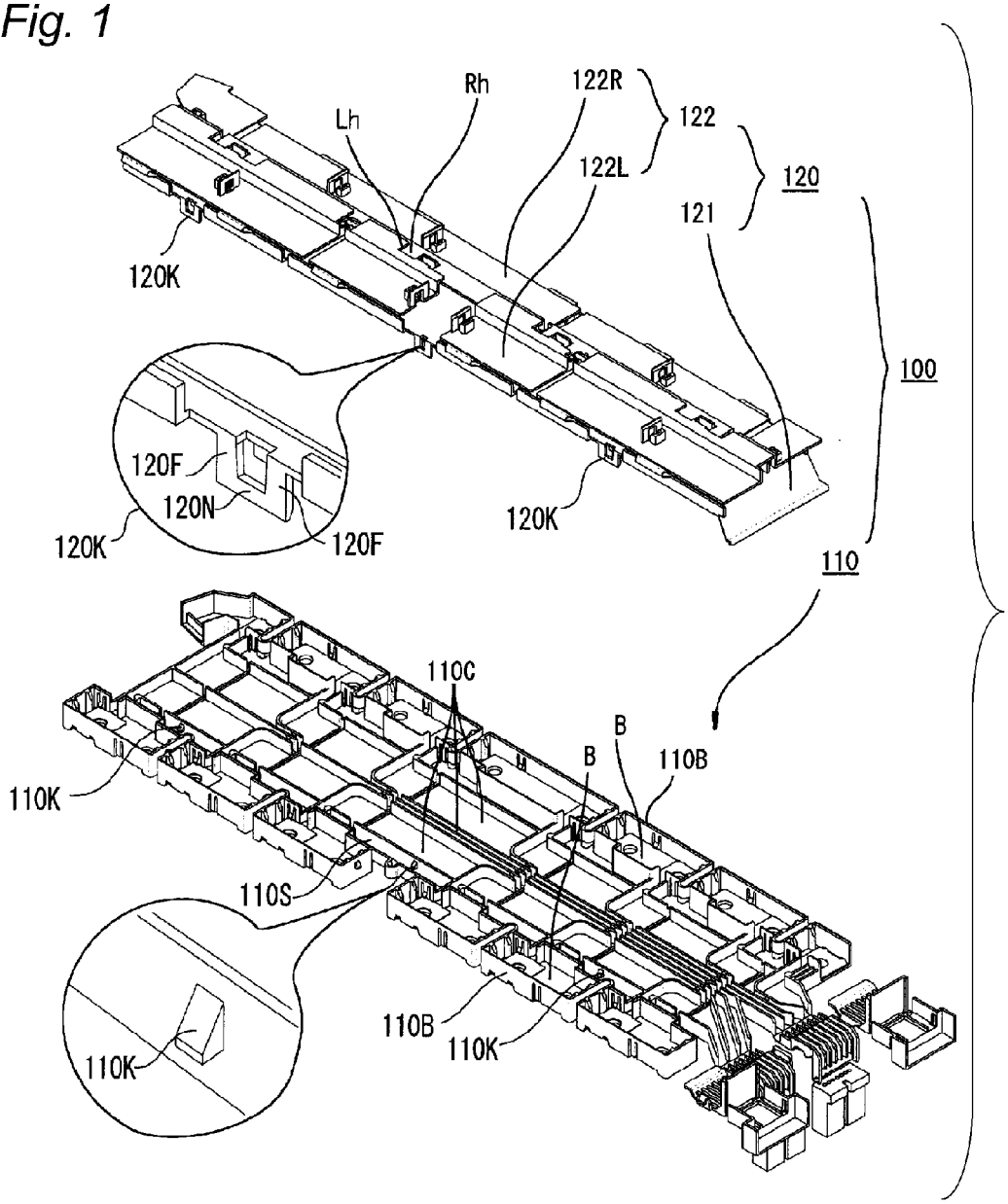
FIG. 1 is a perspective view before a cover according to the present invention is assembled to a case made of insulative resin in which busbars made of conductive metal and thermistors for temperature detection are installed.
Figure 2:
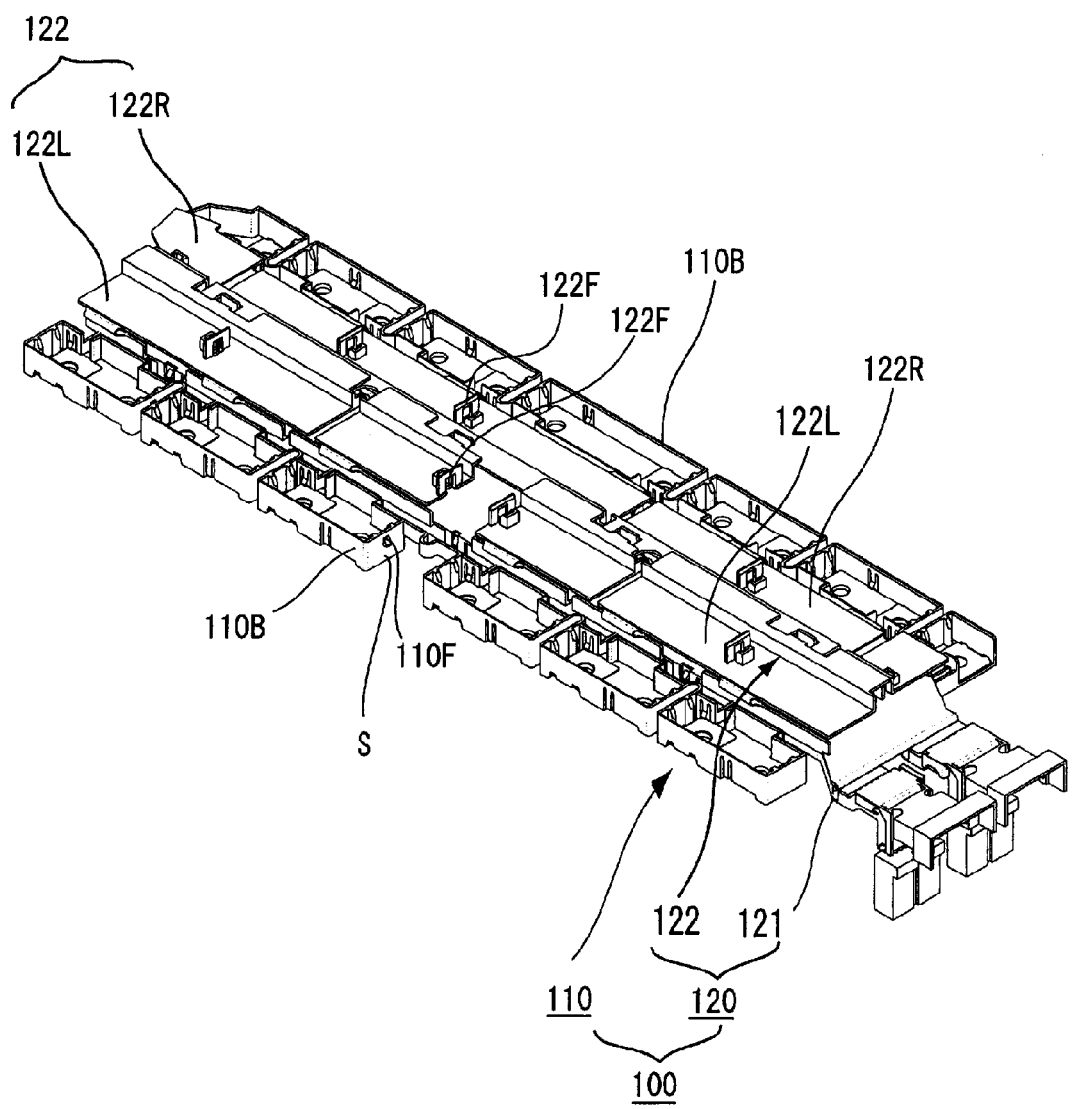
FIG. 2 is a perspective view of a state that the cover is assembled to the case in an original state of FIG. 1.
Figure 3:
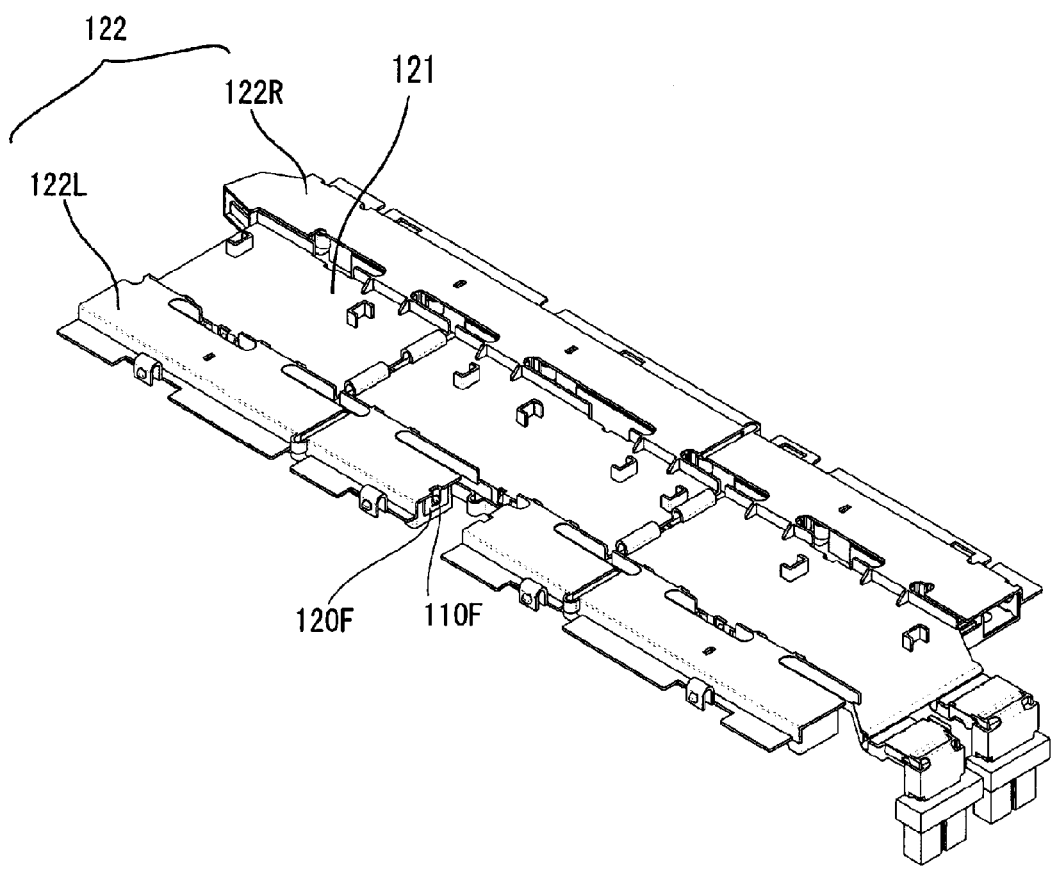
FIG. 3 is a perspective view of a state that two side covers of the cover are expanded from the state of FIG. 2 and electrified parts are covered.
Figure 4A:
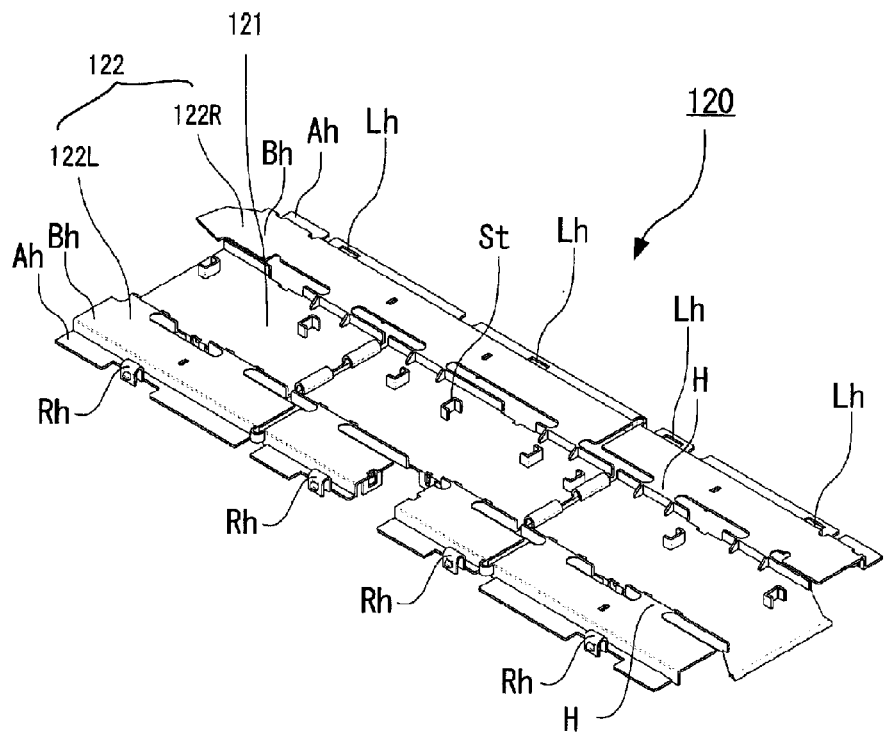
FIGS. 4A and 4B are perspective views of the front sides of the cover according to the invention.
Figure 4B:
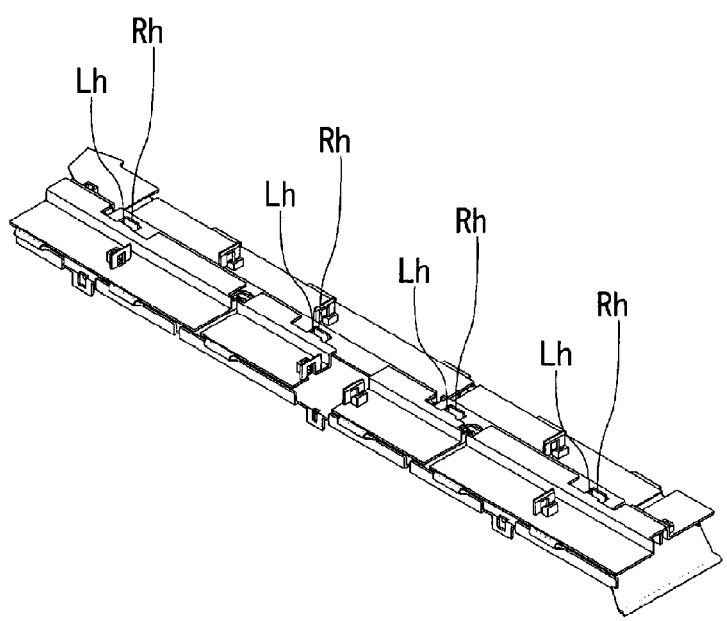
Figure 5:
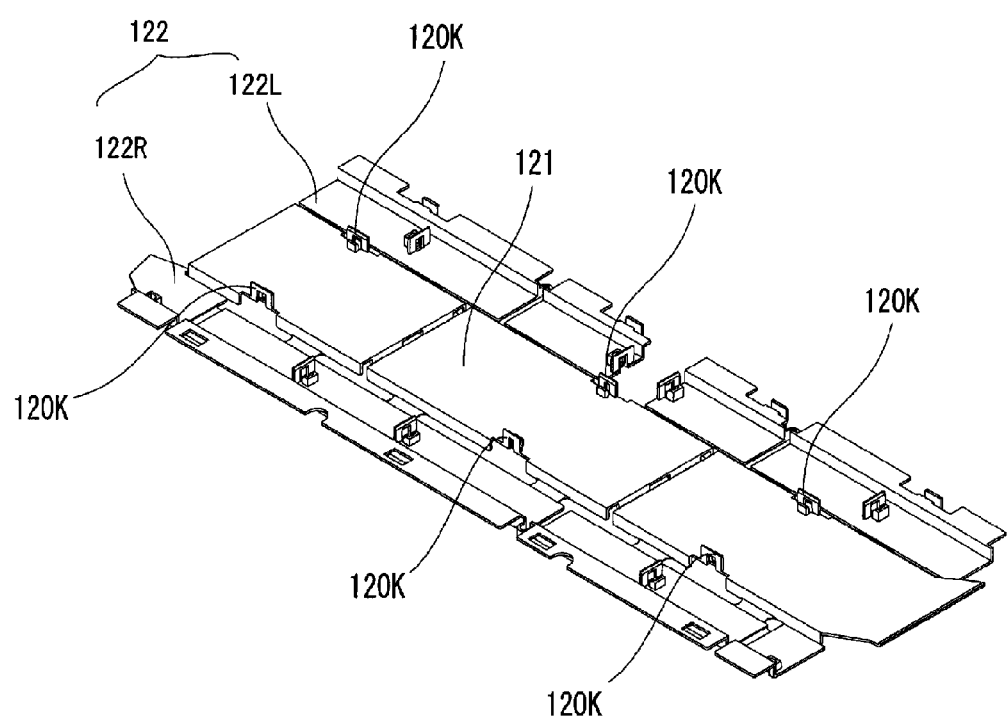
FIG. 5 is a perspective view after the cover of FIG. 4A is reversed.

FIGS. 1 to 3 are perspective views which show a cover according to the present invention and a case. FIG. 1 is a perspective view before the cover is assembled to the case. FIG. 2 is a perspective view of a state that the cover in the unexpanded state shown in FIG. 1 is assembled to the case. The state shown in FIG. 2 is a state at the time of transportation. FIG. 3 is a perspective view of a state that two side covers of the cover are expanded from the state of FIG. 2 to cover electrified parts. The state shown in FIG. 3 is a state at the time of use. FIGS. 4A to 5 are perspective views which show the cover according to the present invention, in which FIG. 4A is a perspective view when the two side covers are expanded, and FIG. 4B is a perspective view when the two side covers are folded. FIG. 5 is a perspective view when the cover of FIG. 4A is reversed.

In FIG. 1, a busbar module 100 includes a case 110 made of insulative resin and a cover 120 made of insulative resin according to the present invention. Busbars made of conductive metal and thermistors for temperature detection are installed in the case 110, and the cover 120 is installed onto the case 110.

Next, the case 110 and the cover 120 made of insulative resin according to the present invention are described in detail.

The case 110 (FIG. 1) is resin-molded, and includes a plurality of rectangular frame-like busbar accommodating parts 110B along the right and left ends, respectively. The plurality of busbar accommodating parts 110B accommodate busbars B that tie in series battery cells which are not shown in the figure and are disposed below. The case 110 further includes voltage detection wire accommodating parts 110C in a middle part between the right and left busbar accommodating parts 110B. The voltage detection wire accommodating parts 110C accommodate the wires of voltage detecting terminals for the voltage detection of the battery cells.

In the following figures, when there are a plurality of members that are the same, if all members were given the same reference symbols, the figures would become hard to see since there are too many symbols. Therefore, as a general rule, symbols are given only to the representative ones, and the other members will not be given symbols.

When the cover 120 of FIG. 1 is installed onto the case 110 of FIG. 1, as shown in FIG. 2, the busbar module 100 is transported in this state. At the time of use, two side covers 122 are expanded. The two side covers 122 are a right cover 122R and a left cover 122L in FIG. 2. As shown in FIG. 3, the right and left busbar accommodating parts 110B of the case 110 are covered with the two side covers 122 of the cover 120.

The voltage detection wire accommodating parts 110C in the central part of the case 110 are covered with a central cover 121 of the cover 120.

To maintain a state that the cover 120 is installed to the case 110, the present invention is provided with locking mechanisms A. The locking mechanisms A includes locking projections 110K of the case 110 (FIG. 1) and locking frames 120K of the cover 120 (FIG. 1) to be described in detail below.

In FIG. 5, which is a perspective view in which the cover 120 is reversed, a plurality of locking frames 120K are formed upwards on the back side of the central cover 121 near the right cover 122R and the left cover 122L, respectively. In FIG. 5, three of the locking frames 12K are on the right side, and three of the locking frames 12K are on the left side. In the enlarged part of FIG. 1, the locking frames 12K are formed downwards from the back side.

On the other hand, in FIG. 1, the locking projections 110K (the enlarged part of FIG. 1) are formed on side walls 110S which form the voltage detection wire accommodating parts 110C of the case 110.

Figure 6A:
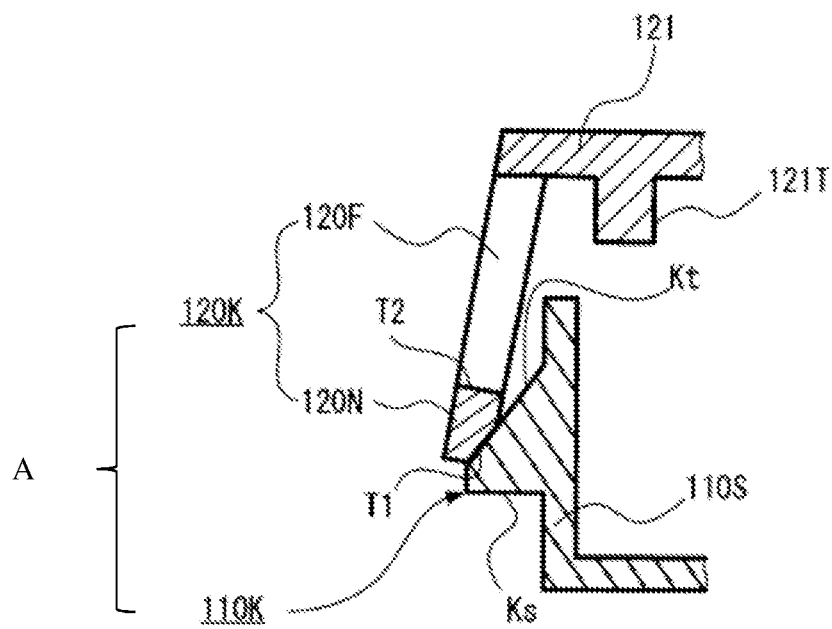
FIGS. 6A and 6B are sectional views showing one example of locking mechanisms A for assembling the cover to the case.
Figure 6B:
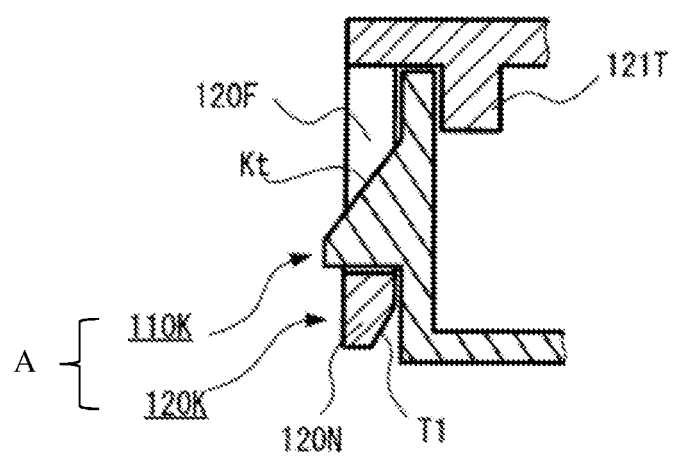

The locking mechanisms A of the locking projections 110K of the case 110 and the locking frames 120K in FIG. 1 are explained using FIGS. 6A and 6B.

FIG. 6A shows a state just before the locking mechanism A is locked, and FIG. 6B shows a state that the locking mechanism A is locked.

In FIG. 6A, the locking projection 110K is resin molded integrally with the case 110, and is formed to have a vertical section of a roughly right-angled triangle including a taper Kt which has such a direction that the projection becomes narrower upwards and a perpendicular part Ks formed from the end side of the greatest projected part of the taper Kt towards the side wall 110S.

The locking frame 120K is resin molded integrally with the cover 120, and includes two leg sections 120F, 120F (the enlarged part of FIG. 1) which are raised downwards from the back side of the central cover 121 and spaced the width between the locking projections 110K, and a joint 120N with which the distal ends of the two leg sections 120F, 120F are coupled. The two leg sections 120F, 120F are elastically deformable due to the elasticity that resin material itself has. To make it easy to embed the locking projection 110K in the space among the two leg sections 120F, 120F and the joint 120N, a taper T1 is formed at the case side of the distal end of the joint 120N, and a perpendicular part T2 for locking is formed at the anti-taper side of the joint 120N.

When the central cover 121 descends from a state of FIG. 6A and is pressed onto the case 110, the joint 120N of the locking frame 120K of the central cover 121 abuts against the taper T1 of the locking projection 110K of the case 110.

When the central cover 121 is further pressed, the leg sections 120F, 120F of the locking frame 120K deform elastically and advance downwards because of the elasticity of the resin materials of the leg sections 120F, 120F and the taper T1 of the locking projection 110K.

Finally, the joint 120N of the locking frame 120K crosses the locking projection 110K, the leg sections 120F, and 120F recovery elastically, and the perpendicular part T2 of the joint 120N of the locking frame 120K is opposed to the perpendicular part Ks of the lower side of the projection 110K as shown in FIG. 6B. Thus, the locking mechanisms A are locked. A rib 121T, which is formed on the back side of the central cover 121 and spaced the thickness of the side wall 110S from the side end of the locking frame 120K, is a fall preventing rib that prevents the side wall 110S from falling after the locking mechanisms A are locked.

FIG. 2 shows a state that the cover 120 is installed onto the case 110 with the locking mechanisms A (a third locking mechanism) in this way. After that, because the cover 120 are installed onto the case 110 with the locking mechanisms A, even if an external force is applied to the case 110 and/or the cover 120, the cover 120 will not drop from the case 110.

The case 110 and the installing of the case 110 and the cover 120 are described as above.

Next, the cover 120 according to the present invention is described.

The cover 120 (FIG. 4A) includes a wide, oblong central cover 121 at the central part and two side covers 122 at the two side. The side covers 122 ha narrow and elongating shape. The side covers 122 are a right cover 122R and a left cover 122L as shown in FIG. 2. The central cover 121 and the right cover 122R, and the central cover 121 and the left cover 122L can be opened and closed with hinges H by narrow parts, respectively. Because the narrow right cover 122R and the narrow left cover 122L can be folded with the hinges H, respectively, when first the right cover 122R covers the wide central cover 121 and then the left cover 122L covers the right cover 122R, as shown in FIG. 4B, the right cover 122R and the left cover 122L will be locked to each other with locking mechanisms B to be described.

In the locking mechanisms B (a first locking mechanism), openings Lh of the right cover 122R and U-shaped elastic members Rh of the left cover 122L are used (FIGS. 4A and 4B).

In the right cover 122R, a step is formed between a hinge side Bh (FIG. 4A) and an anti-hinge side Ah (FIG. 4A) so that the anti-hinge side Ah becomes slightly lower than the hinge side Bh, and a plurality of openings Lh are formed in the anti-hinge side Ah. In FIGS. 4A and 4B, four openings Lh are formed.

On the other hand, in the left cover 122L, a step is formed between a hinge side Bh (FIG. 4A) and an anti-hinge side Ah (FIG. 4A) so that the anti-hinge side Ah becomes slightly lower than the hinge side Bh, and a plurality of U-shaped elastic members Rh are formed in the anti-hinge side Ah. In FIGS. 4A and 4B, four U-shaped elastic members Rh are formed.

Stoppers St (FIG. 4A), which receive to make the right cover 122R floated at a predetermined height from the central cover 121 when the right cover 122R is folded onto the central cover 121 through the hinges H, are formed at a plurality of places on the central cover 121. In FIG. 4, the stoppers St are formed at eight places on the central cover 121.

Therefore, when the right cover 122R is folded onto the central cover 121 through the hinges H, because the hinge side Bh of the right cover 122R is supported by the stoppers St, the hinge side Bh is maintained in a floated state from the central cover 121. Because the openings Lh at the four places formed on the right cover 122R are also in a floated state, the U-shaped elastic members Rh at the four places formed on the left cover 122L can be fitted within the openings Lh.

In this state, then, when the left cover 122L is folded onto the right cover 122R which is folded onto the central cover 121 through the hinges H, because the U-shaped elastic members Rh at the four places formed on the left cover 122L are engaged in the openings Lh at the four places formed in the anti-hinge side Ah of the right cover 122R, respectively, a folded state of the two side covers 122 is maintained.

The locking mechanisms B of the openings Lh of the right cover 122R and the U-shaped elastic members Rh of the left cover 122L in FIGS. 4A and 4B are described using FIG. 7.

Figure 7A:
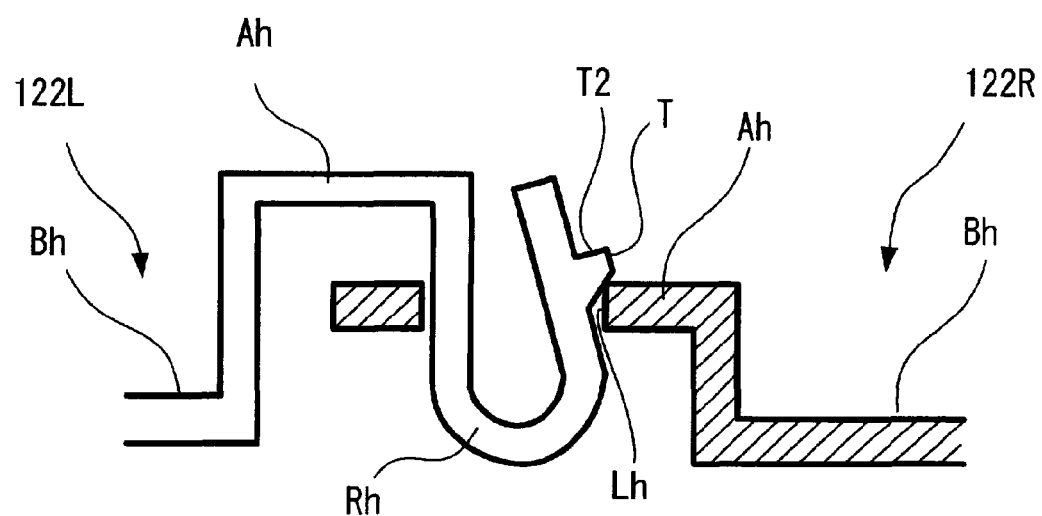
FIGS. 7A and 7B are sectional views showing one example of locking mechanisms B for keeping that the two side covers of the cover are folded.
Figure 7B:
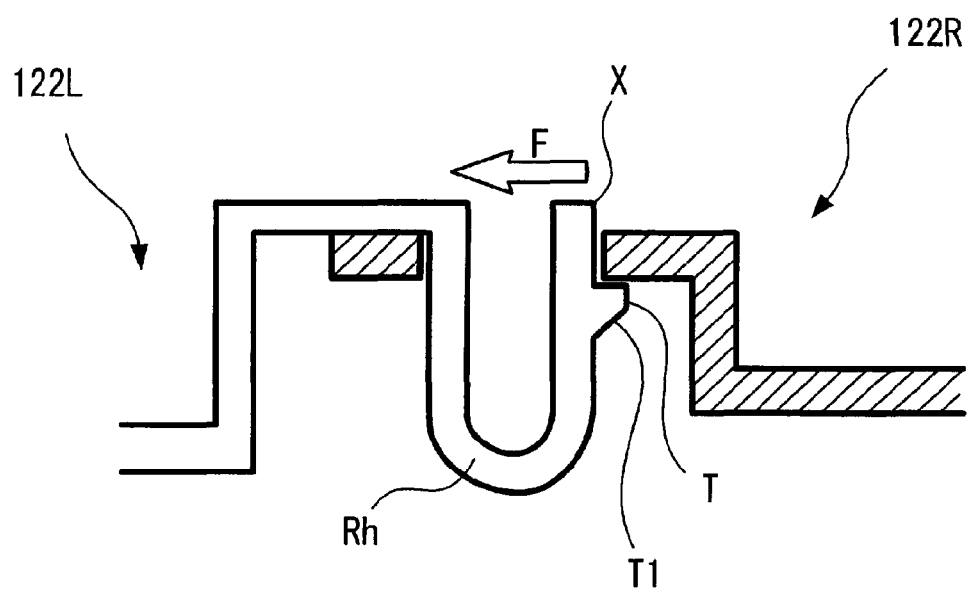

FIGS. 7A and 7B are sectional views which show one example of the locking mechanisms B for keeping that the two side covers 122 are folded by engaging the U-shaped elastic members Rh formed on the left cover 122L in the openings Lh formed at the anti-hinge side Ah of the right cover 122R. FIG. 7A is a sectional view just before the locking mechanism B is locked, and FIG. 7B is a sectional view after the locking mechanism B is locked. In FIG. 7A, the opening Lh is formed at the anti-hinge side Ah of the right cover 122R, and on the other hand, the U-shaped elastic member Rh is formed on the left cover 122L. A projection T is formed outwards near the distal end of the U-shaped elastic member Rh, a taper T1 (FIG. 7B) is formed at the curving part side of the projection T, and a perpendicular part T2 is formed at the side opposite to the curving part side of the projection T (FIG. 7A).

Thus, when the left cover 122L is pressed on the right cover 122R which is folded earlier, the U-shaped elastic member Rh gets into the opening Lh of the right cover 122R from the curving part side, then the taper T1 of the projection T abuts with the border of the opening Lh, and the U-shaped elastic member Rh deforms elastically and advances due to the elasticity that the resin material of the U-shaped elastic member Rh itself has and the taper T1.

Then, when the left cover 122L is further pressed against the right cover 122R, the projection T of the U-shaped elastic member Rh crosses the border of the opening Lh, the U-shaped elastic member Rh recoveries elastically, and finally, the perpendicular part T2 of the projection T of the U-shaped elastic member Rh is locked in the opening Lh of the right cover 122R, as shown in FIG. 7B. Thus, the locking mechanisms B are locked.

FIG. 4B shows that the right cover 122R and the left cover 122L are folded onto the central cover 121 as shown in FIG. 1, the U-shaped elastic members Rh of the left cover 122L fit in the openings Lh of the right cover 122R, and a folded state of the two side covers 122 is maintained.

When wires are wired in Factory A and busbar plates are fixed to batteries with fixing parts in Factory B, it is necessary to protect the wires so that the wires will not project and get scratched at the time of transporting from Factory A to Factory B. Thus, the voltage detection wire accommodating parts 110C (FIG. 1) are covered with the central cover 121 to protect the wires as shown in FIG. 2. On the other hand, to make it easy to start next work in Factory B, the busbar accommodating parts 110B are transported in a state that the two side covers 122 are folded onto the central cover 121, respectively, and the busbar accommodating parts 110B are exposed. The folded state is maintained with the locking mechanisms B described above.

Because the U-shaped elastic member Rh has a shape easy to be flexed so that a worker in Factory B can release the folded state of the two side covers 122 with fingers easily, and the distal end X (FIG. 7B) is formed to project upwards from the opening Lh at the anti-hinge side Ah, the folded state of the two side covers 122 can be released easily when a worker holds the distal end X with fingers and flexes in the arrow direction F.

After the folded state of the two side covers 122 is released, the two side covers 122 are expanded and the busbar accommodating parts 110B are covered. To maintain the state that the two side covers 122 are expanded, locking mechanisms C are provided in the present invention.

After the busbar plates are fixed to the batteries with the fixing parts in Factory B, the two side covers 122 are expanded and the busbar accommodating parts 110B (FIG. 1) of the case 110 are covered. There are the locking mechanisms C for maintaining the state that the two side covers are expanded.

The locking mechanisms C include locking projections 110F (FIG. 2) of the case 110 side and locking frames 122F (FIG. 2) of the two side covers 122 side of the cover 120.

In FIG. 2 which is a perspective view in which the cover is assembled to the case in an unexpanded state, the locking projections 110F are formed on the side surfaces S of the narrow side of the plurality of rectangular frames-like busbar accommodating parts 110B covered with the right and left covers 122R, 122L. In FIG. 2, three locking projections are formed in the busbar accommodating parts 110B of the left cover 122L, and four locking projections are formed in the busbar accommodating parts 110B of the right cover 122R, but only one is seen in FIG. 2. The shape of the locking projection 110F is the same as the locking projection 110K (FIG. 1) of the locking mechanisms A, and is resin molded integrally with the case 110. The locking projection is formed to have a vertical section of a roughly right-angled triangle (refer to FIG. 8) including a taper which has such a direction that the projection becomes narrower upwards and a perpendicular part that forms a right angle from the end side of the greatest projected part of the taper towards the side surface S.

On the other hand, in FIG. 2 which is the perspective view in which the cover is assembled to the case in an unexpanded state, a plurality of locking frames 122F are formed upwards with a right angle in the length direction on the back side of the right and left covers 122R, 122L, respectively. In FIG. 2, three of the locking frames 122F are disposed in the right cover 122R, four of the locking frames are disposed in the left cover 122L.

The shape of the locking frames 120F is the same as the locking frames 120K (FIG. 1) of the locking mechanisms A, and is resin molded integrally with the cover 120. The locking frame 120F includes two leg sections 122H, 122H which are raised and spaced the width of the locking projection 110F, and a joint 122N with which the distal ends of the two leg sections 122H, 122H are coupled. The two leg sections 122H, 122H are elastically deformable due to the elasticity that resin material itself has. To make it easy to embed the locking projection 110F in the space among the two leg sections 122H, 122H and the joint 122N, a taper is formed at the case side of the distal end of the joint 122N, and a perpendicular part for locking is formed at the anti-taper side of the joint 122N.

Figure 8A:
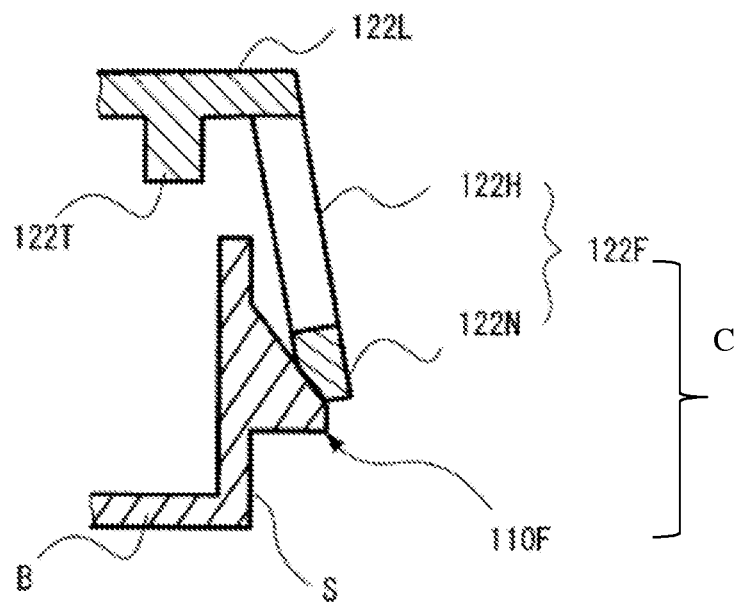
FIGS. 8A and 8B are sectional views showing one example of locking mechanisms C for keeping that the two side covers of the cover are expanded.
Figure 8B:
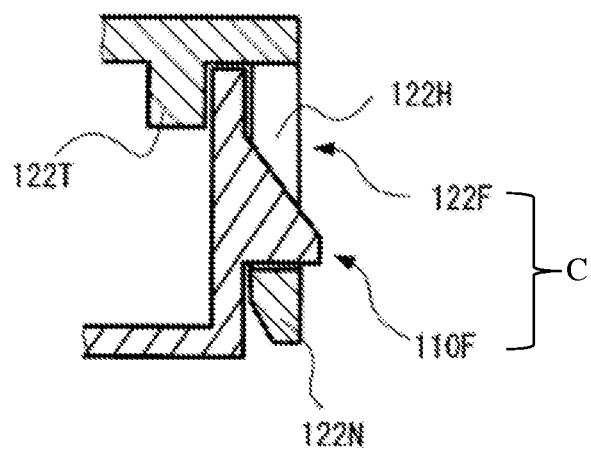
Figure 9:
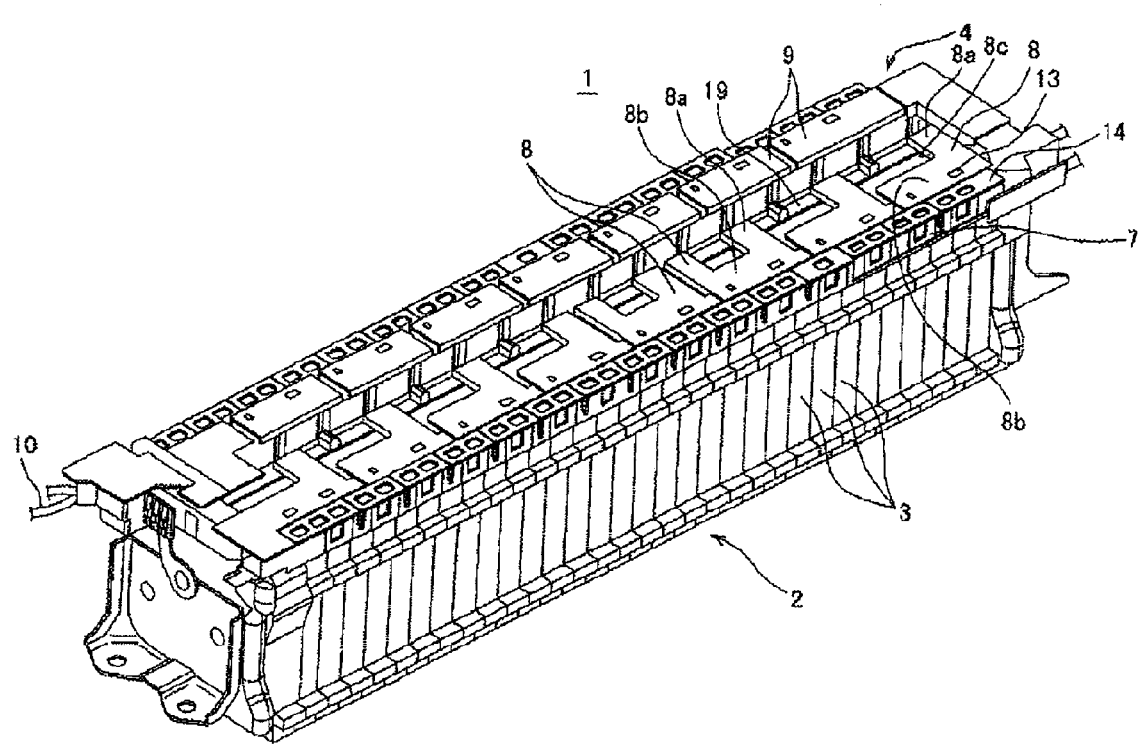
FIG. 9 is a whole perspective view which shows one embodiment of the cover structure of the power supply device according to a PTL 1.
Figure 10A:
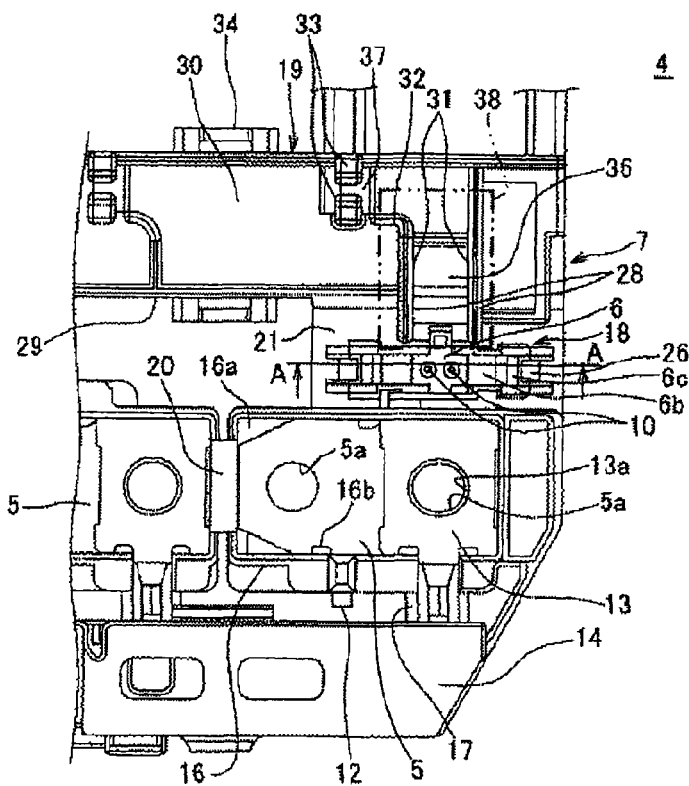
FIGS. 10A and 10B are top views of a case which shows main parts of the cover structure of FIG. 9.
Figure 10B:
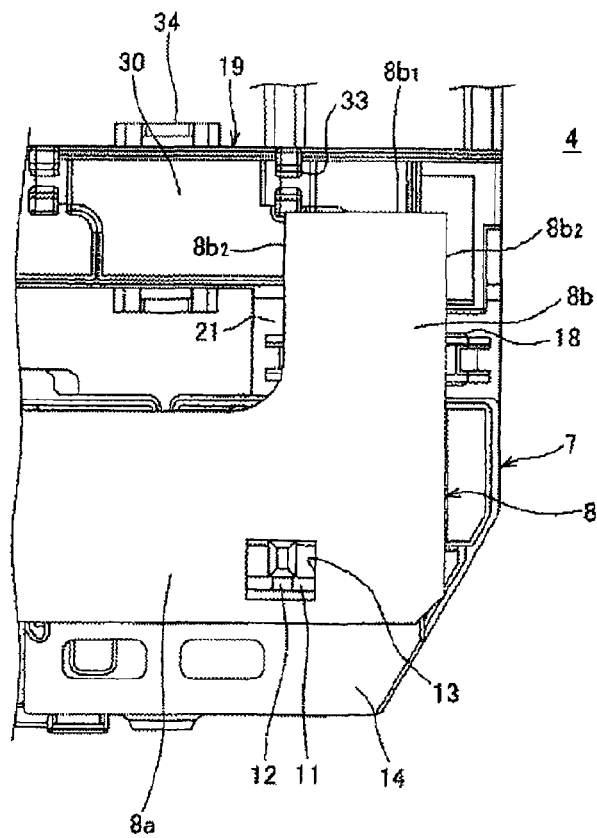

The locking mechanisms C constructed of the locking projections 110F of the case 110 side and the locking frames 122F of the cover 120 side above mentioned are described using FIGS. 8A and 8B.

FIG. 8A shows a state just before the locking mechanism C is locked, and FIG. 8B shows a state that the locking mechanism C is locked.

When, for example, the left cover 122L descends from a state of FIG. 8A and is pressed onto the case 110, the joint 122N of the locking frame 122F of the left cover 122L abuts against the taper of the locking projection 110F of the case 110 side.

When the left cover 122L is further pressed, the leg sections 122H, 122H of the locking frame 122F deform elastically and advance downwards because of the elasticity of the resin materials of the leg sections 120F, 120F and the taper of the locking projection 110F.

Finally, the joint 122N of the locking frame 122F crosses the locking projection 110F, the leg sections 122H, 122H recovery elastically, and the perpendicular part of the joint 122N of the locking frame 122F is opposed to the perpendicular part of the lower side of the projection 110F as shown in FIG. 8B. Thus, the locking mechanisms C are locked.

Ribs 122T are formed on the back sides of the right and left covers 122R, 122L and spaced the thickness of the wall S from the side end of the locking frame 122F. The Ribs 122T are fall preventing ribs that prevent the wall S from falling after the locking mechanisms C are locked.

FIG. 3 shows a state that the locking frames 122F of the two side covers 122 are locked to the locking projections 110F with the locking mechanisms C (a second locking mechanism) in this way, the locking is completed and the two end covers 122 are expanded on the busbar accommodating parts 110B of the case 110.

The busbar module is shipped from Factory A to Factory B in a state that the voltage detection wire accommodating parts of the case are covered with the central cover of the cover and the right and left busbar accommodating parts are exposed as they are. After the busbars and the like are fixed into the right and left busbar accommodating parts in Factory B, the two end covers are expanded to cover and protect the right and left busbar accommodating parts. According to the present invention, because the case and the cover are shipped in an integrated state with the locking mechanisms A, the busbar module can be managed as one article, and the administrative expense can be reduced. Besides, because the busbar module is transported while the two end covers are folded with the locking mechanism B, the operativity is preferable because operations can be performed in Factory without change from before, and the state that the two end covers are folded can be easily released after the operations. Furthermore, because the state that the two end covers are expanded onto the case can be maintained by the locking mechanisms C, the voltage detection wire accommodating parts and the busbar accommodating parts of the case can be protected surely.

According to the present invention, there can be provided an insulative cover by integrating the voltage detection wire accommodating part cover with the cover that covers the electrified parts so that it is possible to only manage one article and the administrative expense can be reduced.

What is claimed is:

1. An insulative cover for covering a case of a busbar module, the insulative cover comprising:
   a central cover configured to cover a voltage detection wire accommodating part of the case; and
   side covers configured to cover busbar accommodating parts of the case and provided at opposite sides of the central cover with hinges between the central cover and the side covers, respectively, wherein
   in a state where the side covers are disposed on the central cover by folding the hinges respectively, one and the other of the side covers are locked to each other with a first locking mechanism,
   when the side covers are disposed on the central cover, a surface of at least one of the side covers rests on a surface of the central cover, and
   when the side covers are disposed on the central cover, an opposing surface of the one side cover contacts a surface of the other side cover such that the side covers and the central cover are substantially parallel to each other.

2. The insulative cover according to claim 1, wherein
   the first locking mechanism includes a U-shaped elastic member in one of the side covers and an opening in the other of the side covers,
   the U-shaped elastic member is configured to be received in the opening,
   in the state where the side covers are moved onto the central cover, the U-shaped elastic member is engaged in the opening so as to maintain a locked state of the side covers, and
   a distal end part of the U-shaped elastic member is flexible.

3. The insulative cover according to claim 1, wherein
   in a state where the side covers are expanded onto the busbar accommodating parts of the case through the hinges, respectively, each of the side covers and the case are locked to each other with a second locking mechanism.

4. The insulative cover according to claim 1, wherein in a state where the central cover is installed onto the case, the central cover and the case are locked to each other by a third locking mechanism.

\* \* \* \* \*